United States Patent [19]

Matsuka et al.

[11] Patent Number: 5,520,857
[45] Date of Patent: May 28, 1996

[54] LIQUID AGENT EVAPORATOR

[75] Inventors: Tsuyoshi Matsuka; Akira Izumi; Tsutomu Takeuchi, all of Kyoto, Japan

[73] Assignee: Dainippon Screen Mfg. Co., Ltd., Kyoto, Japan

[21] Appl. No.: 376,203

[22] Filed: Jan. 20, 1995

[30] Foreign Application Priority Data

Jan. 20, 1994 [JP] Japan .................................. 6-021981
Jan. 28, 1994 [JP] Japan .................................. 6-026113

[51] Int. Cl.$^6$ .................................................... B01F 3/04
[52] U.S. Cl. ............................................ 261/87; 261/119.1
[58] Field of Search .................................... 261/119.1, 87

[56] References Cited

U.S. PATENT DOCUMENTS

| | | | |
|---|---|---|---|
| 2,527,531 | 10/1950 | Cates | 261/119.1 |
| 2,621,754 | 10/1952 | Doyle | 261/119.1 |
| 2,748,892 | 6/1956 | Aguilera | 261/119.1 |
| 3,321,191 | 5/1967 | Najarian | 261/119.1 |
| 3,350,322 | 10/1967 | Waterhouse | 261/119.1 |

Primary Examiner—Tim R. Miles
Attorney, Agent, or Firm—Lowe, Price, LeBlanc & Becker

[57] ABSTRACT

A liquid agent evaporator includes a sealed container accommodating a liquid agent therein and having a generally flat upper internal face and a vapor outlet, a carrier gas feeder for feeding the carrier gas into the sealed container, and a carrier gas blower provided in the upper internal surface of the sealed container for blowing the carrier gas fed from the carrier gas feeder so that the blown carrier gas comes into contact with substantially the entirety of the upper internal surface of the sealed container. The carrier gas blower is provided, for example, at the center of the upper internal surface of the sealed container and blows the carrier gas radially at an initial velocity directed at least to the upper internal surface side of the sealed container. The carrier gas blower can include a gas blow tube which is communicated with a gas feed tube and has a plurality of gas outlets formed on the top face side of the gas blow tube. By translating the gas blow tube so that the top face thereof comes to be in close proximity to the top face of the sealed container, the carrier gas blown from the gas outlets can reach substantially the entirety of the upper internal surface of the sealed container.

12 Claims, 8 Drawing Sheets

LIQUID AGENT EVAPORATOR

FIELD OF THE INVENTION AND RELATED ART STATEMENT

The present invention relates to liquid agent evaporators, and more particularly, it is concerned with a liquid agent evaporator which is used in evaporating liquid material (liquid agent) so that the material can be used in the form of vapor when a processing such as etching in a semiconductor manufacturing process is carried out.

DESCRIPTION OF THE BACKGROUND ART

Organic solvent and liquid agent of high vapor pressure in particular tend to condense within an evaporator on account of a slight variation of the atmospheric temperature. Accordingly, it is required that condensation of the liquid agent be effectively removed so that clean vapor can be supplied stably and reproducibly in this type of evaporator. In addition, corrosive and flammable chemical vapor should be supplied stably and reproducibly in the evaporator.

In the meanwhile, there are in general two systems for controlling flow rate of vapor supplied from the evaporator, i.e., a carrier control system and a liquid material direct control system. The former system uses an inert gas of nitrogen or the like as a carrier gas which indirectly causes the liquid material to evaporate thereby controlling the flow rate of the vapor, while the latter system directly controls the flow rate of the liquid material or the flow rate of the vapor itself generated from the liquid material.

One example of the evaporator (vaporizer) of the carrier control system is a carburetor used in an internal combustion engine. In the carburetor, the carrier gas introduced from a wider mouth is compressed at a narrower part (venturi), and then is reduced in pressure during expansion. The pressure-reduced gas causes the liquid agent to be introduced into a nozzle from a tank, whereby the liquid agent is sprayed from the nozzle so as to be evaporated quickly under the reduced pressure.

There is another method in which the vapor of the liquid agent can be obtained by enhancing evaporation of liquid agent by means of heating of the liquid agent. Such method can be implemented in two ways. One way is to supply vapor not by force but by pressure of the generated vapor, and the other way is to supply vapor by introducing a certain amount of carrier gas into the liquid agent tank.

Another example of the carrier control system is shown in FIGS. 1 and 2, respectively. An evaporation amount of the liquid agent is determined by a temperature and a saturated vapor pressure of the liquid agent. In the evaporator shown in FIG. 1, a liquid agent 2 is evaporated at a room temperature within a liquid agent tank 1 formed by a sealed container, and then a certain amount of carrier gas controlled by a massflow controller 3 is introduced into liquid agent tank 1. More particularly, the vapor of the liquid agent whose evaporation amount is determined by the temperature of liquid agent and the vapor pressure thereof is discharged from liquid agent tank 1 through a vapor outlet (not shown) by means of the carrier gas in the evaporator shown in FIG. 1 to be supplied to an etching chamber or the like.

In an evaporator shown in FIG. 2, a liquid agent 5 is accommodated within a liquid agent tank 4 formed by a sealed container, and then a certain amount of carrier gas whose amount is controlled by a massflow controller 6 is blown into a liquid agent 5, whereby liquid agent 5 is bubbled to be evaporated. Thereafter, the vapor of liquid agent is discharged from liquid agent tank 4 together with the carrier gas through a vapor outlet (not shown) to be supplied to an etching chamber or the like.

In the first example of the evaporator of the material direct control system, a certain amount of liquid agent whose with amount is controlled by a liquid massflow controller is fed into a heating evaporator thereby heating the liquid agent to evaporate. The second example of such an evaporator controls the flow rate of vapor directly by providing a massflow controller in a piping disposed on the vapor outlet side of the evaporator shown in FIG. 2.

Appropriate ones of the above-described systems of the evaporators are selected depending on such factors as the property of liquid agent, the precision required for controlling flow rate, and the cost. When the vapor generated by evaporating the flammable and corrosive liquid agent is used, the range of useable control systems is limited depending on the material of evaporators and the necessity of heating operation. In addition, the material direct control system cannot be adopted in this case, since the use of the vapor massflow controller is prohibited in controlling the flow rate of corrosive vapor.

Therefore, the system adopted to control the flow rate of vapor of the flammable and corrosive liquid agent is restricted to one using evaporators shown in FIGS. 1 and 2. In particular, the evaporator shown in FIG. 2 is frequently used because of its simple structure and, property of generating the vapor of a higher concentration than that allowed in FIG. 1, alike. However, the evaporator shown in FIG. 2 is likely to generate mist on account of bubbling. For instance, if the vapor of liquid agent is used in etching, mist mixed in the vapor might attach to an etched surface. Accordingly, an etching rate becomes greater in a part provided with mist than in other parts, whereby etching cannot be carried out uniformly. On the other hand, from the viewpoint of material, it is difficult to use a mist trap on account of handling of corrosive liquid agents. Thus, the evaporator shown in FIG. 2 cannot be used for etching without a means for completely removing mist from vapor. In this respect, the evaporator shown in FIG. 1 has been used in such a processing as etching.

There is, nevertheless, a disadvantage in the evaporator shown in FIG. 1 in that liquid agent condenses within liquid tank 1. In the case of using the liquid material of a high vapor pressure, in particular, the material is likely to condense on account of a slight variation of the room temperature or the temperature of liquid agent. Droplets caused by such condensation are liable to attach to an inner surface of an upper cover of liquid tank 1, and particularly large droplets are liable to attach to the cover at the periphery thereof. If droplets attach to the inner surface of the upper cover of liquid tank 1, an area to contact the liquid agent with the carrier gas is changed thereby altering an evaporation area of the liquid agent. Accordingly, the evaporation amount of liquid agent is varied, which disables precise control of the vapor of liquid agent, so as not to effect supply of the vapor with a constant flow rate desired. Thus, the droplets attaching onto the inner surface of the upper cover of liquid agent tank 1 need to be removed in order to control precisely the flow rate of vapor of the liquid agent supplied from the evaporator.

The droplets attaching to the inner surface of the upper cover of liquid agent tank 1 shown in FIG. 1 can be removed either by removing the droplets physically by means of, e.g., a wiper, or by removing the droplets by evaporation using a carrier gas. In the case of using the wiper or the like, it is very much likely that particles are generated. In addition, the droplets cannot be removed effectively by only blowing the carrier gas into liquid agent tank 1 as can be seen from FIG. 1. As a result, the time required for removal of droplets becomes longer, while evaporation of liquid agent 2 accommodated within liquid agent tank 1 proceeds. This means that the liquid agent is consumed more than necessary in accordance with a droplet removal operation. Further, in order to compensate for decrease in temperature of liquid agent 2 on account of evaporation, a time-consuming operation of temperature adjustment is required for stabilizing the temperature of liquid agent 2 again, before supply of vapor of the liquid agent is started at a constant flow rate from the evaporator. Thus, there are many problems in the method of simply blowing the carrier gas into liquid agent tank 1.

SUMMARY OF THE INVENTION

The present invention is made in order to address the above-described problems. In particular, the present invention is directed to an improvement of an evaporator in which a liquid agent especially a flammable and corrosive liquid agent is evaporated within a sealed container by feeding at a constant flow rate a carrier gas into the container accommodating the liquid agent, and then the generated vapor is discharged from the container by the carrier gas.

An object of the present invention is therefore to provide a liquid agent evaporator capable of using liquid agent effectively.

Another object of the present invention is to provide a liquid agent evaporator capable of reducing a time necessary to start supplying vapor of liquid agent at a constant flow rate, thereby reducing the liquid agent wasted at the time of start-up.

Still another object of the present invention is to provide a liquid agent evaporator capable of effectively removing droplets generated within a sealed container, thereby reducing a time necessary to start supplying vapor of liquid agent at a constant flow rate.

Still another object of the present invention is to provide a liquid agent evaporator capable of effectively removing droplets generated at the periphery of an internal surface of a sealed container, thereby reducing a time necessary to start supplying vapor of liquid agent at a constant flow rate.

Still another object of the present invention is to provide a liquid agent evaporator capable of effectively removing droplets generated within a sealed container without generating particles.

A liquid agent evaporator according to the present invention includes: a sealed container having a generally flat upper internal surface and an outlet of a vapor, the sealed container serving to accommodate liquid agent; a carrier gas feed device for feeding a carrier gas into the sealed container; and a carrier gas blow device provided in the upper internal surface of the sealed container for blowing a carrier gas supplied by the carrier gas feed device so that the blown carrier gas comes into contact with substantially the entirety of the upper internal surface of the sealed container.

In such a liquid agent evaporator, the carrier gas blown by the carrier gas blow device comes in contact with substantially the entirety of the upper internal surface of the sealed container. Even if droplets are generated on the upper internal surface of the sealed container, those droplets can be evaporated quickly by the carrier gas blown thereto. Therefore, an evaporation amount of the liquid agent within the sealed container can be stabilized quickly and the flow rate of the vapor of liquid agent can be controlled precisely.

According to one aspect of the present invention, the carrier gas blow device of the liquid agent evaporator includes a radially-blow device provided in generally the center of the upper internal surface of the sealed container for radially blowing the carrier gas with an initial velocity directed at least to the upper internal surface side of the sealed container. The radially-blow device can include an annular projection which is provided generally at the center of the internal surface of the sealed container projecting downward. A lower end face of the annular projection is formed such that a distance between the lower end face and the upper internal surface is greater in the center part than at the periphery. The carrier gas feed device includes a gas feed tube having an outer diameter smaller than an inner diameter of the annular projection, penetrating the upper part of the sealed container and protruding through the center of the annular projection past the lower end face of the annular projection, and having a plurality of gas flow holes disposed at the periphery of the lower part of the gas feed tube. The radially-blow device also includes a disk having a top face in a shape corresponding to the lower end face of the annular projection and mounted to the lower end of the gas feed tube so that a predetermined distance is provided between the top face of the radially-blow device and the lower end surface of the annular projection, and a space is defined by an internal peripheral surface of said annular projection, said top face of said disk, and said upper internal surface of said sealed container, said gas feed tube being adapted to feed said carrier gas into said space.

In this structure, the carrier gas is blown radially from the carrier gas blow device provided in the center of the upper internal surface of the sealed container, whereby the carrier gas contacts directly and entirely the upper internal surface of the sealed container. In the event that droplets attach to the upper internal surface of the sealed container, those droplets can be evaporated effectively and removed quickly by directly hitting those droplets with the carrier gas. In other words, the droplets attaching to the upper internal surface of the sealed container can be removed uniformly, since the carrier gas is radially blown from the center of the upper internal surface of the sealed container so as to contact the entire upper internal surface thereof.

FIG. 3 schematically shows how the carrier gas is fed into the sealed container so as to evaporate the liquid agent, and how the carrier gas flows so as to discharge the vapor of liquid agent from the evaporator according to the present invention. As can be seen from FIG. 3, the carrier gas fed into a sealed container 7a is blown in a radial manner from the center of the upper internal surface horizontally or somewhat upwardly. Then, the carrier gas reaches once the upper internal surface and goes around toward the surface of a liquid agent 8a so as to be in contact with the liquid surface. This prevents local temperature decrease caused by locally enhanced evaporation of liquid agent 8a, whereby the surface temperature of liquid agent 8a can be kept constant.

On the contrary, as can be seen from FIG. 4, in the conventional evaporator in which the carrier gas is simply blown into a sealed container 7b from the upper center of the container, the carrier gas directly reaches the surface of a liquid agent 8b, and then goes around toward the upper internal surface thereof. This enhances local evaporation of liquid agent 8b to cause a local temperature decrease. Consequently, the surface temperature of liquid agent 8b becomes unstable, such that a stable flow rate of vapor cannot be obtained.

Since the carrier gas blow device is formed by the annular projection and the disk as described above, so as to be combined with the carrier gas feed device, a tapered gap can be formed between the lower end surface of the annular projection and the top face of the disk. The carrier gas is blown from this tapered gap obliquely upward toward the upper internal surface of the sealed container. Therefore, it is possible to directly blow the carrier gas to the outer periphery of the upper internal surface if the lower end surface of the annular projection and the top face of the disk are set at an appropriate angle. Thus, larger droplets which are liable to attach to the upper internal surface, especially the outer periphery thereof, can be removed effectively.

According to another aspect of the present invention, a carrier gas feed device includes a gas feed tube for feeding a carrier gas into a sealed container. A carrier gas blow device includes a gas blow tube being communicated with the gas feed tube and having a plurality of gas outlets formed on the top face side thereof, and a device for movably supporting the gas feed tube so that the top face of the gas blow tube is in close proximity to the upper internal surface of the sealed container and that the carrier gas blown from the plurality of gas outlets is directed to substantially the entire region of the upper internal surface of the sealed container.

Preferably, the sealed container has a hollow cylindrical shape having a circular cross section. The gas blow tube has a length shorter than the inner diameter of the sealed container. The supporting device includes a rotary supporting device which causes the plurality of gas outlets to face upward and provides the top face of the gas blow tube in close proximity to the upper internal surface of the sealed container, the rotary supporting device being provided in the center of the upper internal surface of the sealed container and adapted to rotate said gas feed tube around that center in a horizontal plane. The plurality of gas outlets can be disposed asymmetrically with respect to the portion supported by the rotary supporting device. Also, the plurality of outlets can be provided at intervals such that the interval between the gas outlets adjacent to each other becomes smaller in general as a distance from the portion supported by the rotary supporting device increases.

In this structure, the carrier gas fed to the gas blow tube through the carrier gas feed tube is blown from the plurality of gas outlets provided in the gas blow tube. Then, the carrier gas is blown directly onto the upper internal surface of the sealed container. The carrier gas is blown directly to droplet even if the droplets attach to the upper internal surface of the sealed container. Further, the gas blow tube is in close proximity to the upper internal surface of the container, such that the carrier gas can reach the droplets with its gas flow rate kept high. Therefore, the droplets can be vaporized effectively and removed quickly. The gas blow tube is movably supported and the carrier gas is blown from its plurality of gas outlets to the entire upper internal surface of the sealed container. Thus, the droplets attached to the upper internal surface of the container can be removed completely.

FIG. 5 schematically shows how the carrier gas is fed into the sealed container so as to evaporate the liquid agent within the container, and how the carrier gas flows during discharge of vapor of the liquid agent from the container by using the carrier gas in the case of the evaporator according to this aspect of the present invention. With reference to FIG. 5, the carrier gas fed into a sealed container 7*c* once reaches the upper internal surface of the container and diffuses around, and then goes around toward the surface of a liquid agent 8*c* so as to be in contact with the liquid surface. This avoids a local variation in temperature caused by enhanced evaporation of liquid agent 8*c* locally, whereby the surface temperature of liquid agent 8*c* can be kept constant.

Since a plurality of gas outlets are disposed asymmetrically relative to the portion supported by the rotary supporting means, then that area of the upper internal surface of the sealed container which the carrier gas blown from the gas outlets directly reaches becomes twice as large as that in the case where the same number of gas outlets are disposed symmetrically relative to the portion supported by the rotary supporting means. Accordingly, the droplets attached to the upper internal surface of the sealed container can be removed effectively. In the meanwhile, since the gas outlets are disposed at intervals such that the interval becomes smaller in general as a distance between the gas outlets adjacent to each other and the portion supported by the rotary supporting means increases, the flow rate of the carrier gas directly reaching the upper internal surface of the sealed container is larger at the periphery than in the center. Thus, the large droplets which are liable to be attached to the upper internal surface of the sealed container especially at the outer periphery thereof can be removed effectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates an example of a conventional evaporator.

FIG. 2 shows another example of a conventional evaporator.

FIG. 3 schematically illustrates a path through which a carrier gas flows in an evaporator according to the present invention.

FIG. 4 schematically illustrates a path through which a carrier gas flows in a conventional evaporator.

FIG. 5 schematically illustrates a path through which a carrier gas flows in an evaporator according to another aspect of the present invention.

FIG. 6 is a cross sectional view schematically showing an evaporator according to a first embodiment of the present invention.

FIG. 7 is a cross sectional view taken along line VII—VII of the apparatus shown in FIG. 6.

FIG. 8 is an enlarged cross sectional view of a carrier gas inlet of the apparatus shown in FIG. 6.

FIG. 9 is a graph showing variation in surface temperature and vapor amount of liquid agent as a sealed container accommodating the liquid agent is purged with a nitrogen gas in the evaporator according to the first embodiment of the present invention.

FIG. 10 is a graph showing variation in surface temperature and vapor amount of liquid agent as a sealed container accommodating the liquid agent is purged with a nitrogen gas in a conventional evaporator, this graph being provided for use in comparison with the graph shown in FIG. 9.

FIG. 11 is a cross sectional view schematically showing an evaporator according to a second embodiment of the present invention.

FIG. 12 is a cross sectional view schematically showing a major part of an evaporator according to a third embodiment of the present invention.

DESCRIPTION OF THE PREFERRED EMBODIMENTS

[Embodiment 1]

Figure 1:
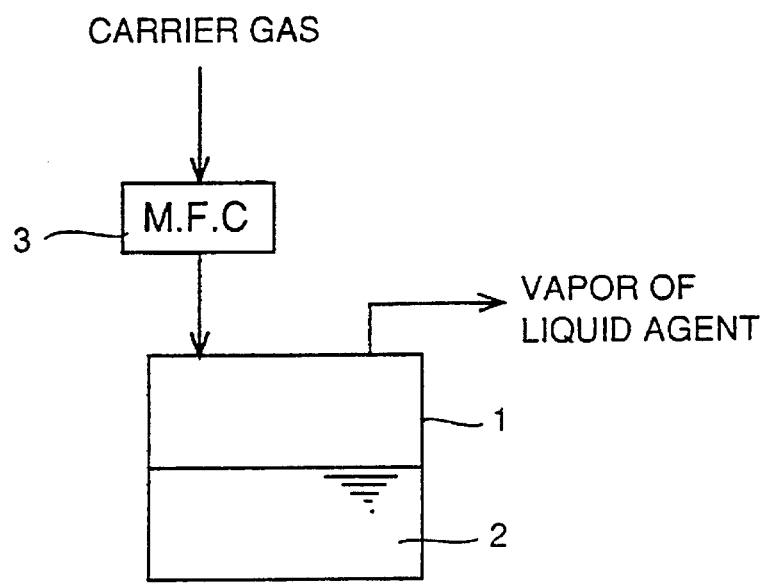
Figure 2:
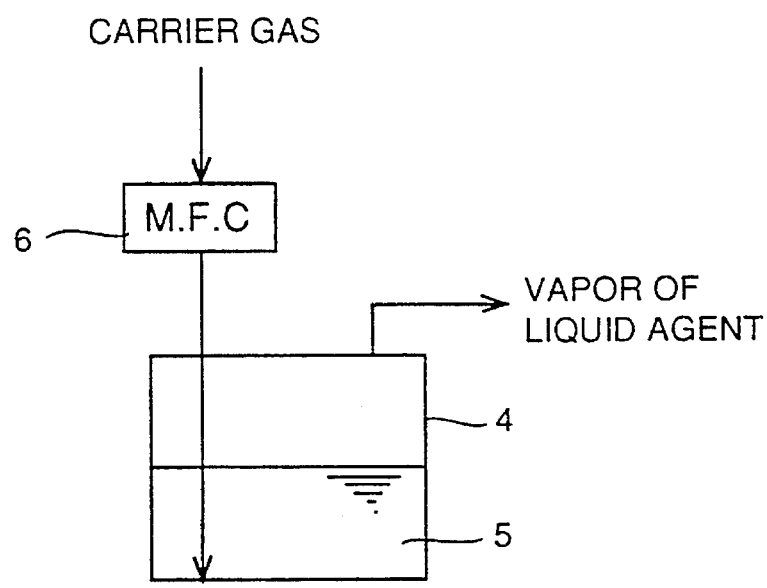

With reference to FIGS. 6–9, an evaporator according to a first embodiment of the present invention includes a sealed container 12 accommodating a liquid agent therein, and a carrier gas inlet 16 provided in an upper cover 14 of sealed container 12 for introducing a carrier gas, for example, a nitrogen gas into sealed container 12 formed in a flat cylindrical shape.

Carrier gas inlet 16 includes a carrier gas blow unit provided in the center of upper cover 14 within sealed container 12 for radially blowing the carrier gas so that the carrier gas can make contact with the entire internal surface of upper cover 14. The carrier gas blow unit includes: an annular projection 18 formed integrally with upper cover 14 in the center of a bottom face of upper cover 14 of sealed container 12 so that the projection protrudes downward from the bottom face of the upper cover, annular projection 18 having an annular shape in an outer diameter of, for example, about 6–10 cm; a disk 20 having a planar shape corresponding to the shape of the outer periphery of annular projection 18, i.e., a circular shape of a diameter of about 6–10 cm, and provided in the lower part of annular projection 18; and a carrier gas feed tube 22 having an outer diameter smaller than an inner diameter of annular projection 18, fixed in the center of upper cover 14, penetrating the same, and having the lower end thereof vertically fixed on the center of disk 20 for holding the same.

A lower end surface 24 of annular projection 18 is formed such that a height from the bottom face of upper cover 14 to lower end surface 24 becomes greater in the center of the annulus than at the periphery thereof. In this embodiment, lower end surface 24 of annular projection 18 is formed such that a vertical line passing through the center of the annulus makes a constant upper angle of less than 90 degrees with that segment which touches lower end surface 24 of annular projection 18 and passes the center of projection 18. In other words, lower end surface 24 of this embodiment constitutes part of a lateral face of a right cone protruding downward from annular projection 18 with its apex being on the axis of the annulus.

A top face 26 of disk 20 is in a shape corresponding to lower end surface 24 of annular projection 18. More particularly, top face 26 of disk 20 is located at a position higher at the outer periphery thereof than in the center. Disk 20 is held by a carrier gas tube 22 such that a gap 28 having a uniform distance can be formed between top face 26 of disk 20 and lower end surface 24 of annular projection 18 all around the periphery of disk 20. The size of gap 28 is, for example, about 1 mm. An angle formed by surfaces 24 and 26 with respect to the central axis of annular projection 18 can be changed depending on a factor such as the inner diameter of sealed container 12.

At the lower end of carrier gas feed tube 22, a plurality of equally spaced gas feed holes 30 are provided at angularly equidistant intervals along a circumferential direction of the tube. The carrier gas introduced into carrier gas feed tube 22 is fed through the plurality of gas feed holes 30 into a small space 32 formed surrounded by the internal peripheral surface of annular projection 18, the top face of disk 20, and the bottom face of the upper cover of sealed container 12. Each of gas feed holes 30 has a diameter of, for example, 1–2 mm, and is formed at a position about 5 mm upward from the lower end of carrier gas feed tube 22 where tube 22 is connected to disk 20.

In the apparatus of the first embodiment, it is possible that droplets may attach not only to the bottom face of upper cover 14 but also to the bottom face of disk 20. Accordingly, it is required that the amount of droplets attached to the bottom face of disk 20 be decreased by reducing the diameter of disk 20 and annular projection 18 as much as possible. Another way to decrease the amount of droplets is to dip the bottom face of disk 20 into liquid agent 10 thereby preventing the droplets from being formed on the bottom face of disk 20.

Figure 6:
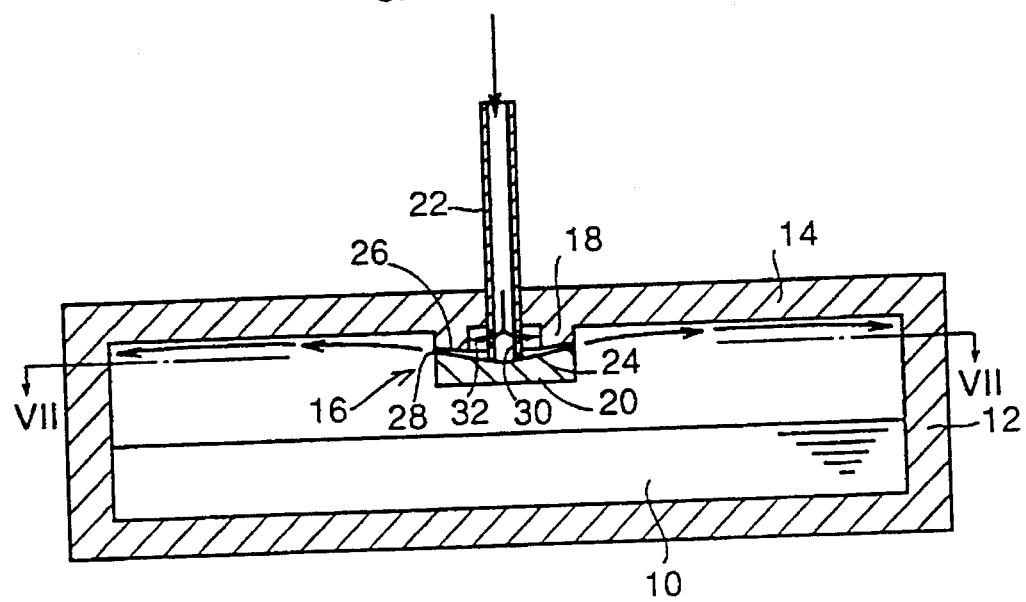
Figure 7:
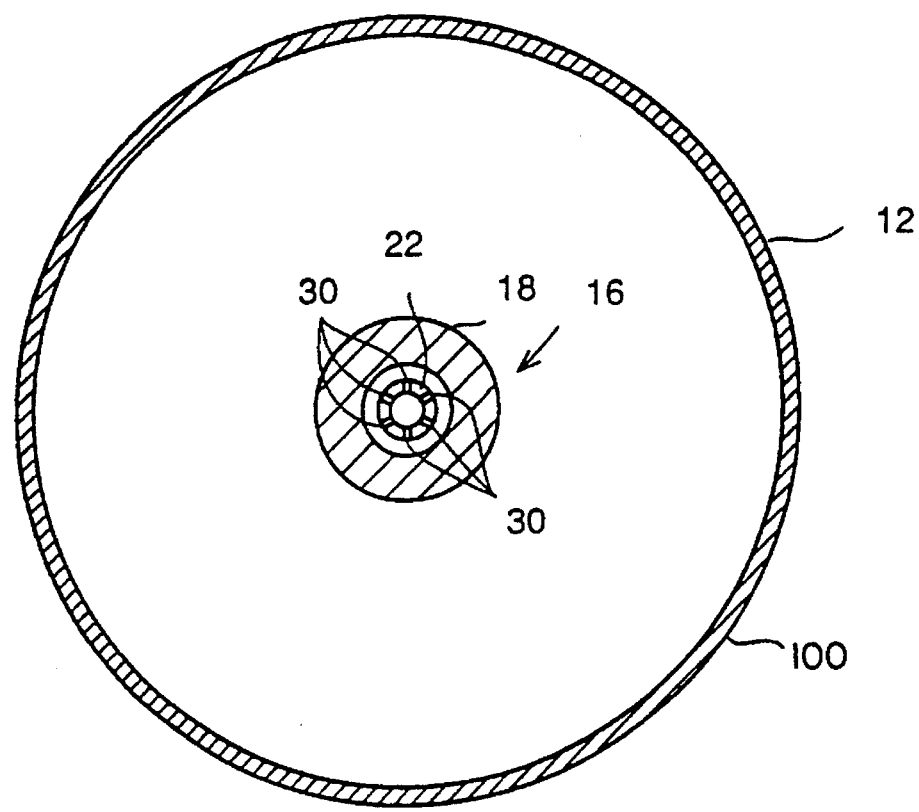
Figure 8:
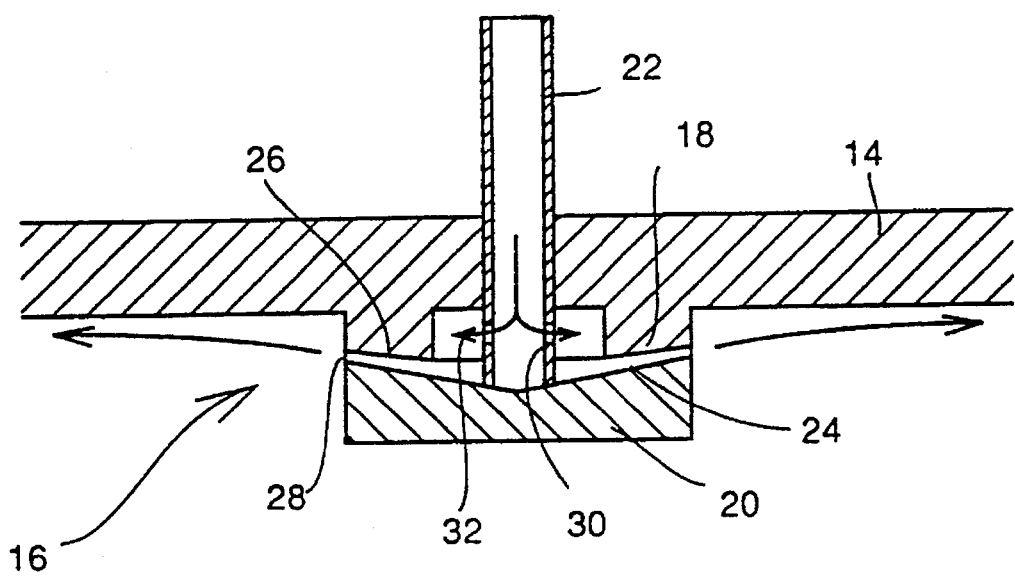

In the evaporator of the first embodiment shown in FIGS. 6–8, the gas is fed from carrier gas feed tube 22 to small space 32 through gas feed holes 30. Then, the carrier gas is introduced from small space 32 into sealed container 12 through gap 28 provided between top face 26 of disk 20 and lower end surface 24 of annular projection 18, whereby the inside of sealed container 12 is purged. In this case, the carrier gas is blown from the entire periphery of gap 28 obliquely upward toward the internal surface of upper cover 14, so as to directly contact the entire internal surface of upper cover 14. Thus, the droplet attaching to the internal surface of upper cover 14 are effectively vaporized and quickly removed.

The carrier gas is blown radially from the center toward the outer periphery of upper cover 14. Then, the carrier gas once flows into small space 32 from gas feed holes 30 equally spaced at angularly equidistant intervals along a direction of circumference at the lower end of carrier gas feed tube 22 before being fed to gap 28. Accordingly, the carrier gas is blown from gap 28 at the entire length of the circumference with an uniform strength, such that the droplets attaching to the internal surface of upper cover 14 can be removed uniformly. In the meanwhile, the carrier gas is blown from tapered gap 28 obliquely upward to the internal surface of upper cover 14, such that the carrier gas can be blown directly to the outer periphery of the internal surface of upper cover 14 if the angle formed by lower end surface 24 of annular projection 18 and top face 26 of disk 20 is set appropriately. More particularly, it is sufficient to set the configuration such that the outer periphery of the internal surface of upper cover 14 is located on a line extending from tapered gap 28. Thus, the large droplets which are liable to attach to the outer periphery of the internal surface of upper cover 14 can be removed effectively.

Figure 3:
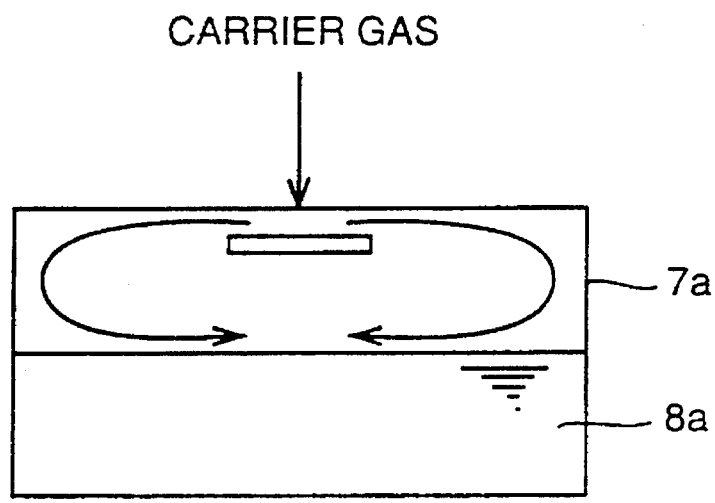

As described above, in the evaporator shown in FIGS. 6–8, the droplets attached to the internal surface of upper cover 14 can be removed quickly by purging the inside of sealed container 12 (7a) with the carrier gas, as shown in FIG. 3. This reduces the time required for the purging operation, and accordingly, the decrease in temperature of liquid agent 10 (8a) on account of evaporation of the liquid agent which might occur during the purging operation can be prevented. Further, the time necessary for temperature adjustment in order to stabilize the temperature of liquid agent again can be eliminated. Thus, the time required after start-up of the evaporator to enable the vapor of liquid agent to be supplied to an etching chamber or the like through a vapor outlet 100 shown in FIG. 7 can be reduced to ½–¾ of that allowed in the conventional evaporator shown in FIG. 4. In addition, the evaporation amount of liquid agent in accordance with the droplet removal operation can be diminished, because the removal of droplets is completed in a short time. Consequently, a waste of liquid agent can be avoided, and the consumed amount of liquid agent can be reduced to ⅗–¾ of that consumed in the conventional evaporator shown in FIG. 4.

Figure 4:
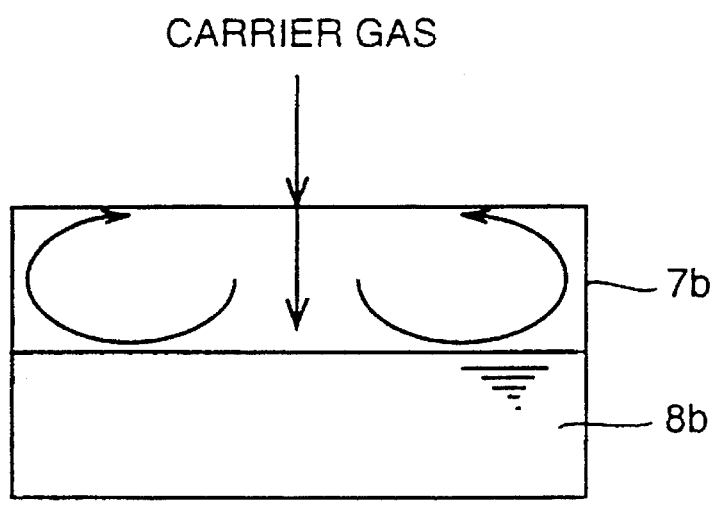
Figure 5:
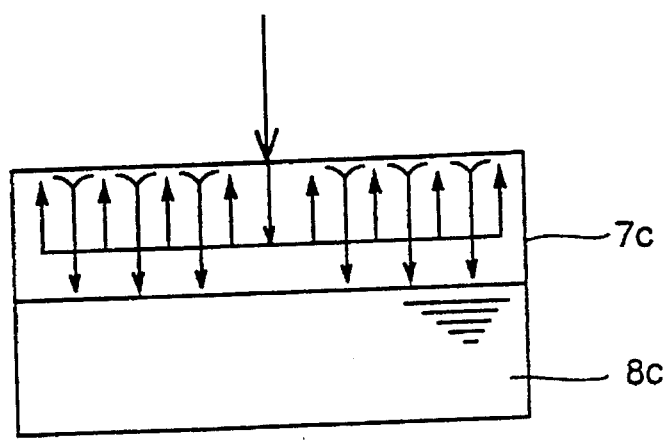

If the carrier gas is blown into sealed container 12 in order to supply vapor after completion of purging employing the conventional evaporator shown in FIG. 4, evaporation of liquid agent 10 is enhanced locally, resulting in a local decrease in temperature. In contrast, with the evaporator shown in FIG. 6, the carrier gas blown from gap 28 provided between lower end surface 24 of annular projection 18 and top face 26 of disk 20 comes into contact with the surface of liquid agent 10 after reaching upper cover 14, thereby avoiding a local decrease in temperature. Thus, the surface temperature of liquid agent 10 within sealed container 12 can be kept constant, and the flow rate of vapor more stable than that allowed in the conventional evaporator shown in FIG. 4 can be achieved by using the evaporator shown in FIG. 6.

Figure 9:
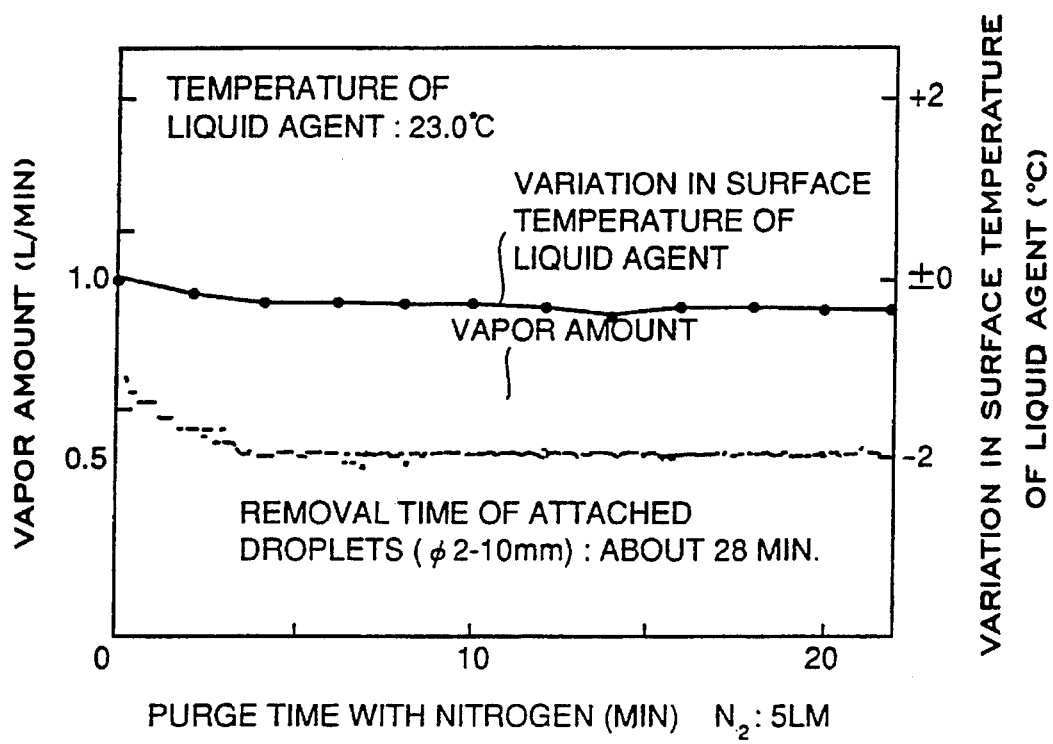
Figure 10:
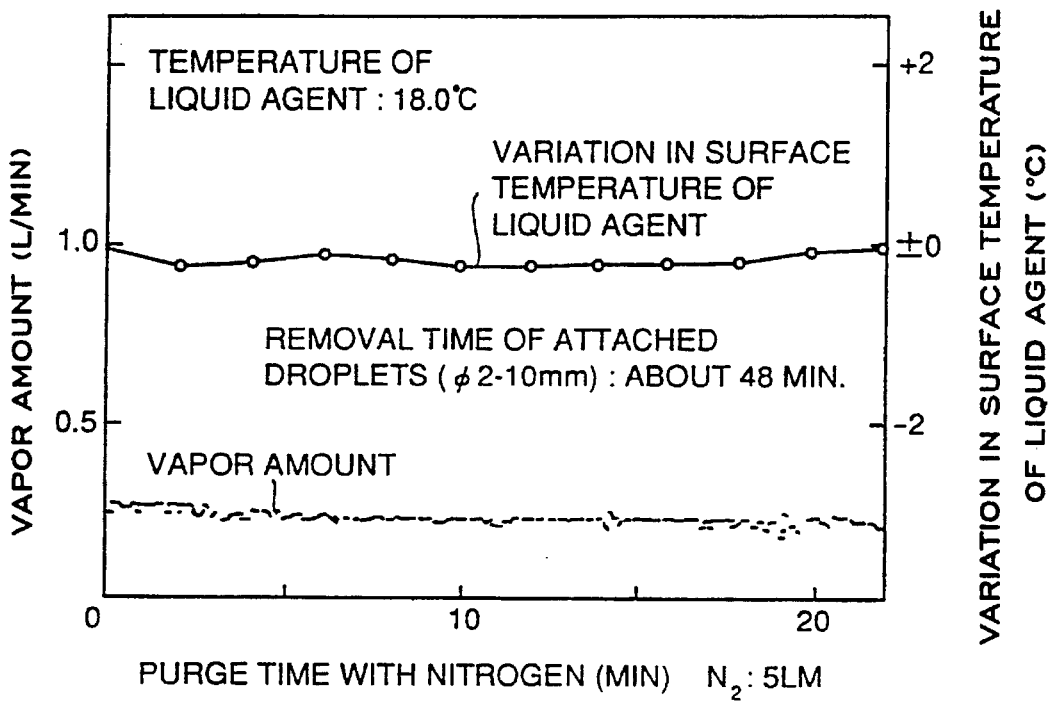

FIGS. 9 and 10 respectively show the test results by using the evaporator of the present invention shown in FIGS. 6–8 and the conventional evaporator shown in FIG. 4, these graphs respectively showing how the surface temperature and the vapor amount of liquid agent are changed as the inside of the sealed container accommodating the liquid agent is purged with a nitrogen gas. Note that FIG. 9 shows the test result by using the evaporator of the present invention shown in FIGS. 6–8, while FIG. 10 shows the test result by using the conventional evaporator shown in FIG. 4.

With reference to FIG. 10, removal of droplets is carried out gradually in the conventional evaporator shown in FIG. 4, wherein although the variation in vapor amount immediately after purging is started is small, the vapor amount continues changing slowly until droplets are completely removed. In contrast, in the evaporator according to the first embodiment of the present invention shown in FIGS. 6–8, the droplets are removed rapidly upon start of purging. The vapor amount is reduced immediately after purging is started, and then the stable supply of a constant amount of vapor can be achieved after removal of droplets. Additionally, as can be seen from FIG. 9, the surface temperature of liquid agent is initially reduced to fall somewhat below a standard value, and thereafter, the temperature changes little in the evaporator according to the first embodiment of the present invention shown in FIGS. 6–8.

[Embodiment 2]

Figure 11:
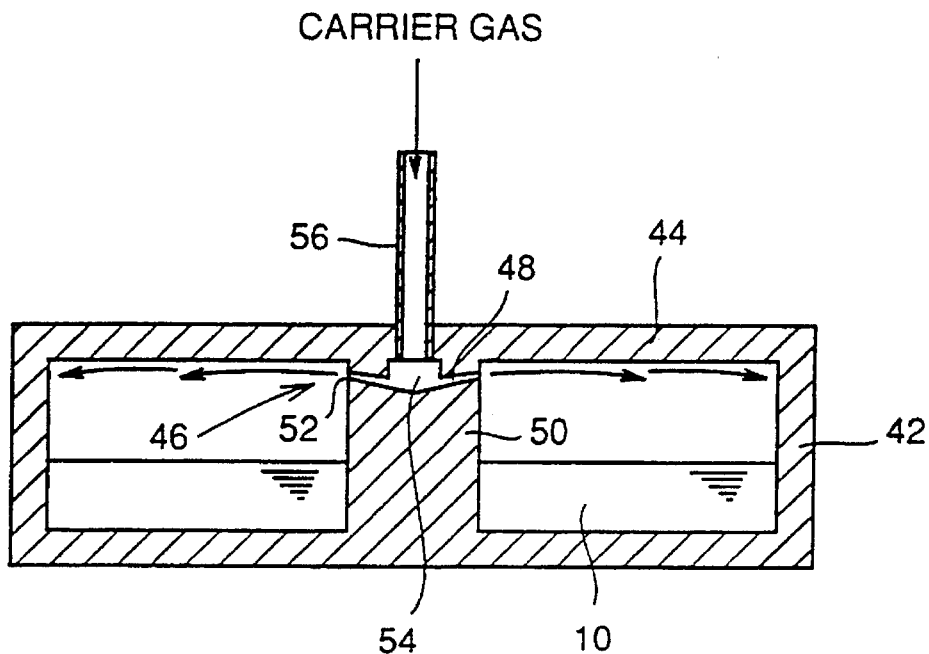

An evaporator according to the second embodiment of the present invention shown in FIG. 11 includes a sealed container 42 and a carrier gas inlet 46 provided in the center within sealed container 42. Carrier gas inlet 46 includes a column 50 provided upright from the inner bottom face of sealed container 42 and having a top face thereof tapered, and an annular projection 48 projecting in the center of an inner surface of an upper cover 44 of sealed container 42. The lower end surface of annular projection 48 and the top face of column 50 are in close proximity and facing with each other, whereby a gap 52 is formed uniformly between the lower end surface of annular projection 48 and the tapered top face of column 50 over the entire peripheries of annular projection 48 and column 50. The carrier gas inlet 46 further includes a carrier gas feed tube 56 for feeding a carrier gas into a small space 54 being in communication with gap 52 and surrounded by the internal peripheral surface of annular projection 48, the top face of column 50, and the internal surface of upper cover 44 of sealed container 42. Carrier gas feed tube 56 is, protruding through upper cover 44, fixed within sealed container 42. In this structure, attachment of droplets onto the bottom face of the disk can be avoided unlike the case of implementing the evaporator shown in FIGS. 6–8.

[Embodiment 3]

Figure 12:
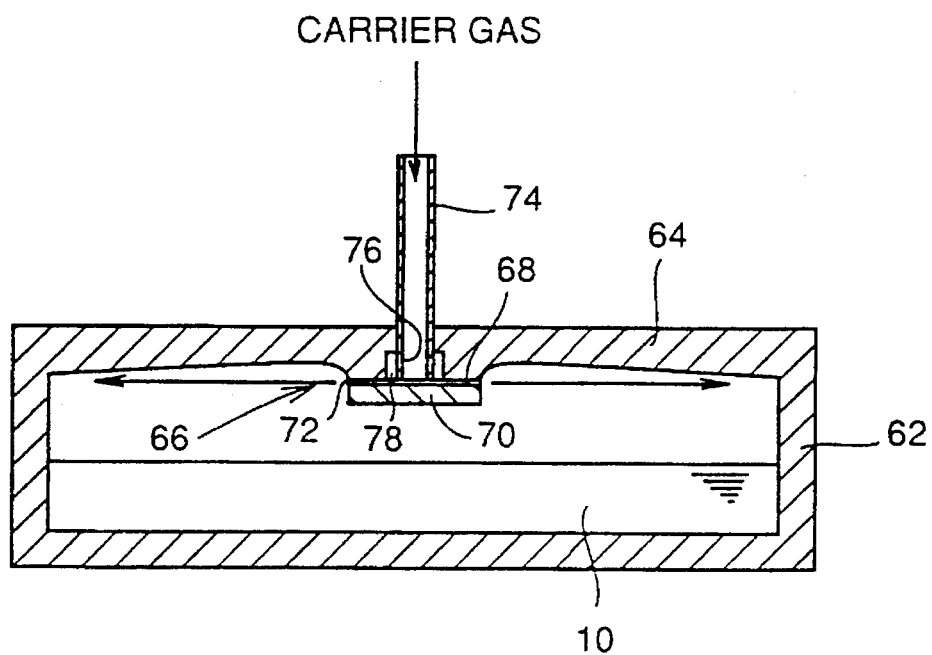

FIG. 12 shows an evaporator according to the third embodiment of the present invention. The evaporator includes a sealed container 62 having an upper cover 64 whose internal surface is gently inclined downward from the center to the outer periphery, and a carrier gas inlet 66 provided in the center of the internal surface of upper cover 64 of sealed container 62. Carrier gas inlet 66 includes an annular projection 68 projecting in the center of the internal surface of upper cover 64 and having a horizontal lower end surface instead of the tapered surface, carrier gas feed tube 74, and a planar disk 70 horizontally held and fixed to the lower end of carrier gas feed tube 74 fixed through upper cover 64 such that a gap 72 is formed uniformly between the top face of disk 70 and the lower end surface of annular projection 68 around the entire peripheries of annular projection 68 and disk 70.

At the lower end of carrier gas feed tube 74 is formed a carrier gas feed hole 76 for feeding a carrier gas into a small space 78 surrounded by the internal peripheral surface of annular projection 68, the top face of disk 70, and the internal surface of upper cover 64 of sealed container 62. In this evaporator according to the third embodiment, the carrier gas fed into carrier gas feed tube 74 blows through gas feed hole 76 into small space 78 from which the carrier gas is blown radially in a horizontal direction through gap 72, and then the carrier gas reaches the outer periphery of the internal surface of upper cover 64 of sealed container 62.

[Embodiment 4]

Figure 13:
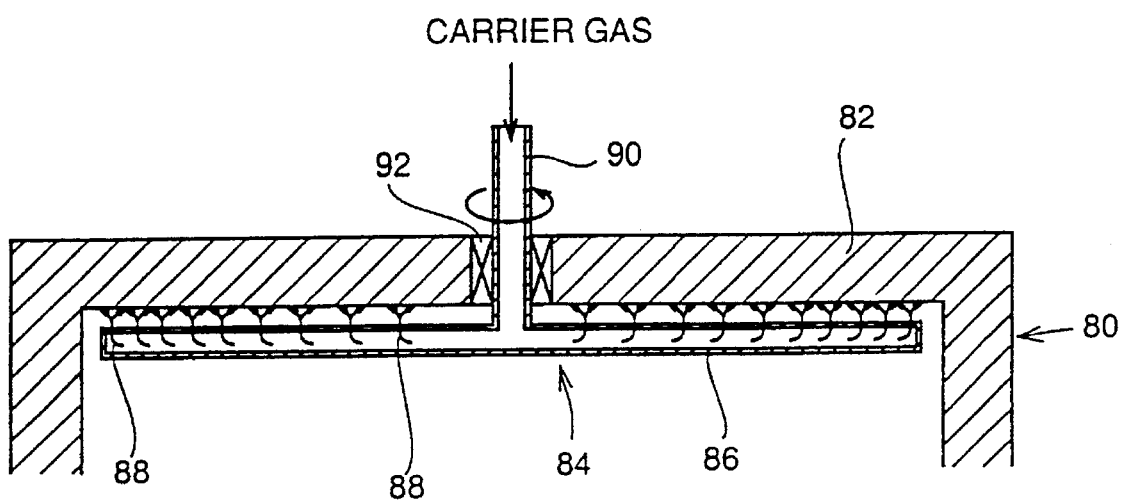
FIG. 13 is a cross sectional view partly showing a liquid agent evaporator according to a fourth embodiment of the present invention.

FIG. 13 is a cross sectional view showing a liquid agent evaporator according to the fourth embodiment of the present invention. The evaporator includes a sealed container 80 accommodating liquid agent therein, and a carrier gas inlet 84 formed in an upper cover 82 of sealed container 80 for introducing a carrier gas, for example, a nitrogen into sealed container 80. Sealed container 80 is formed in a cylindrical shape and an internal surface thereof has a circular cross section.

Carrier gas inlet 84 includes a gas blow tube 86 having both ends thereof closed and having a plurality of nozzles, for example, nozzles 88 of a diameter of about 1 mm formed in a row on the top face side of gas blow tube 86, and a carrier gas feed tube 90 connected to the center of gas blow tube 86 in a form of reverse T shape and protruding through an upper cover 82.

Gas blow tube 86 is provided in the vicinity of and in parallel with the internal surface of upper cover 82, such that a gap of, for example, 2 mm is formed between tube 86 and the internal surface of upper cover 82. Also, gas blow tube 86 has its length about a few millimeters shorter than the inner diameter of sealed container 80. Gas blow tube 86 is rotatably supported by carrier gas feed tube 90 so that gas blow tube 86 can rotate in a horizontal plane about an axis common to carrier gas feed tube 90. Carrier gas feed tube 90 is rotatably supported on an airtight condition by means of a bearing 92 of upper cover 82. By driving carrier gas feed tube 90 to rotate by means of a rotary driving means which is not shown, gas blow tube 86 turns in the horizontal plane with the gap between gas blow tube 86 and the internal surface of upper cover 82 being kept constant.

Figure 14:
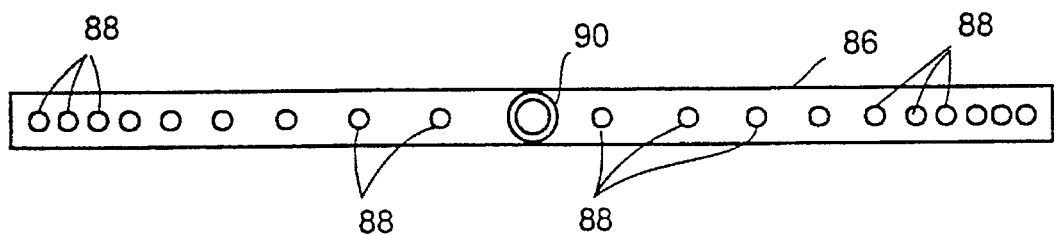
FIG. 14 is a plan view showing a gas blow tube of the liquid agent evaporator according to the fourth embodiment of the present invention.

The plurality of nozzles 88 provided in gas feed tube 86 are disposed asymmetrically relative to a center of gas feed tube 86, as shown in FIG. 14. This arrangement is preferable because that area of the internal surface of upper cover 82 which the carrier gas blown from nozzles 88 directly reaches becomes twice as large as an area allowed in the case where the same number of nozzles are disposed symmetrically. In addition, as can be seen from FIG. 14, an interval between nozzles 88 at the end portion of gas feed tube 86 is smaller than an interval between nozzles 88 in the center portion. This arrangement is preferable in that the flow rate of carrier gas which directly reaches the outer periphery of the internal surface of upper cover 82 to which large droplets are liable to attach becomes greater than that in the center portion of the internal surface of upper cover 82.

In implementing the evaporator according to the fourth embodiment shown in FIG. 13, the carrier gas is fed into sealed container 80 through carrier gas feed tube 90 and gas blow tube 86 so as to purge the inside of sealed container 80. In this event, the carrier gas is blown from nozzles 88 of gas feed tube 86 directly to the droplets attaching to the internal surface of upper cover 82. Also, gas feed tube 86 is provided in the vicinity of the internal surface of upper cover 82 by an interval of about 2 mm, such that the carrier gas can reach the droplets with the gas flow rate kept high. Therefore, the droplets attaching to the internal surface of upper cover 82 can be vaporized efficiently and removed quickly. In the meanwhile, gas blow tube 86 continues blowing the carrier gas to the internal surface of upper cover 82 through the plurality of nozzles 88, while rotating with a constant interval kept between gas feed tube 86 and the internal surface of upper cover 82, such that the droplets attaching to the internal surface of upper cover 82 can be removed uniformly.

As described above, the evaporator according to the fourth embodiment of the present invention shown in FIG. 13 enables quick removal of the droplets attaching to the internal surface of upper cover 82 during purging of the inside of sealed container 80. This prevents decrease in temperature of liquid agent on account of evaporation of liquid agent caused by the purging operation, and also unnecessitates the time required for temperature adjustment to stabilize the temperature of liquid agent again. Accordingly, the time required after the apparatus is started and before the vapor of liquid agent can be supplied to the etching chamber or the like can be reduced to ⅕–⅓ of that allowed in the conventional evaporator shown in FIG. 4. Further, the evaporation amount of liquid agent in accordance with the liquid agent removal operation can be diminished, because removal of droplets is completed in a short time. This avoids a waste of liquid agent, such that the consumed amount of liquid agent can be reduced to ⅗–¾ of that consumed in the conventional evaporator shown in FIG. 4.

When the carrier gas is fed into sealed container 10 after purging in order to supply vapor, evaporation of the liquid agent is enhanced locally to cause a local decrease in temperature by using the conventional evaporator shown in FIG. 4. On the contrary, in the evaporator according to the fourth embodiment of the present invention shown in FIG. 13, the carrier gas blown from nozzles 88 of gas feed tube 86 comes into contact with the surface of liquid agent after reaching upper cover 82, thereby avoiding local decrease in temperature of liquid agent. Thus, by using the evaporator according to the fourth embodiment shown in FIG. 13, the surface temperature of liquid agent within sealed container 80 can be kept constant, and the vapor flow rate stabler than that allowed in the conventional evaporator shown in FIG. 4 can be achieved.

Figure 15:
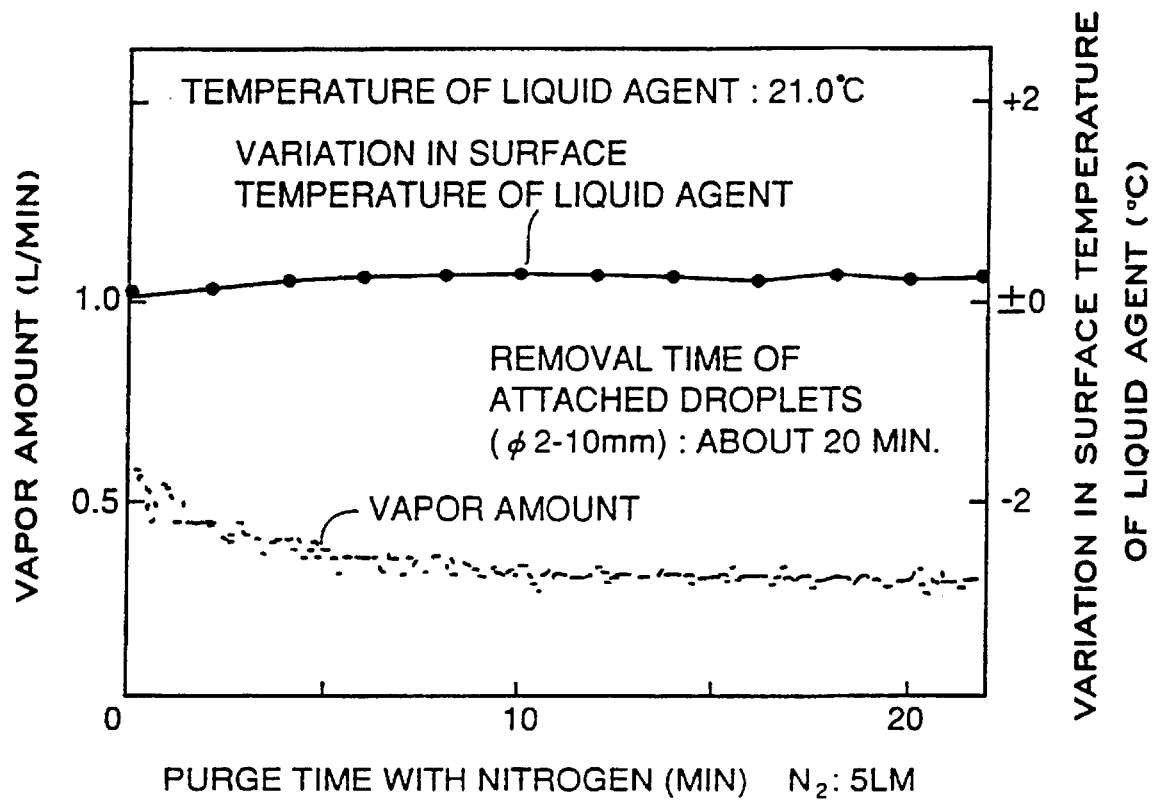
FIG. 15 is a graph showing variation in surface temperature and vapor amount of liquid agent as a sealed container accommodating the liquid agent is purged with a nitrogen gas in the evaporator according to the fourth embodiment of the present invention.

FIG. 15 is a graph showing a test result using the evaporator according to the fourth embodiment of the present invention shown in FIG. 13, wherein how the surface temperature and the vapor amount of liquid agent are changed is measured as the sealed container accommodating the liquid agent is purged with the nitrogen gas. A comparison will be made below between the test results shown in FIGS. 15 and 10. As mentioned above with reference to FIG. 10, the removal of droplets is carried out gradually in the conventional evaporator shown in FIG. 4, such that although the variation in amount of vapor immediately after start of purging is small, the amount of vapor continues changing slowly until the droplets are completely removed. In contrast, by using the evaporator according to the fourth embodiment of the present invention shown in FIG. 13, the droplets are removed rapidly upon start of purging as apparent from FIG. 15. Accordingly, the amount of vapor is reduced immediately after start of purging, whereby once the droplets are removed, a constant amount of vapor can be supplied stably. In addition, there is little change in surface temperature of liquid agent in the evaporator of the fourth embodiment as can be seen from FIG. 15.

The present invention can be implemented with various modifications other than the embodiments described above. For example, in the structure of the evaporator shown in FIGS. 6–8, instead of holding disk 20 by fixing the same to the lower end of carrier gas feed tube 22, the top face of the disk and the lower end surface of the annular projection can be connected at several points so as to form a gap therebetween, such that the disk can be held by the annular projection. In addition, it is possible that the annular projection including an internal space communicating with the carrier gas feed tube is formed integrally in the center of the internal surface of the upper cover of the sealed container, and then a plurality of small through holes communicating with the internal space are formed radially around the periphery of the annular projection itself, whereby the carrier gas can be blown radially from those plurality of small through holes. Further, the carrier gas can simply be blown radially along the internal surface of the upper cover of the sealed container from the center thereof, instead of being blown obliquely with respect to the internal surface of the upper cover of the sealed container.

In the fourth embodiment of the present invention, the sealed container is formed in a cylindrical shape so as to rotate the gas blow tube. The sealed container, however, can have a rectangular cross section, such that the gas blow tube can be translated in a direction perpendicular to an axis line of the gas blow tube. Even in this structure, the carrier gas can be blown to the entire internal surface of the upper cover from nozzles. The gas blow tube and the carrier gas feed tube can be connected in an L shape rather than the reverse T shape, such that the gas blow tube can be rotated around the axis of the carrier gas feed tube. The nozzles of the gas blow tube can be formed such that the carrier gas blown from those nozzles is directed obliquely rather than perpendicularly to the internal surface of the upper cover of the sealed container.

As described above, in an attempt to obtain vapor of an liquid agent, especially a liquid agent of flammable and corrosive properties, by using the liquid agent evaporator according to the present invention, particles will not be caused unlike the case where the droplets attaching to the internal surface of the upper cover of the sealed container are to be removed by a physical method. Accordingly, the time required for droplet removal is reduced, thereby improving work efficiency. This is also advantageous from the viewpoint of cost since an unnecessary waste of liquid agent in accordance with the droplet removal operation can be avoided. Decrease in temperature of liquid agent on account of evaporation of liquid agent during the droplet removal operation can be also avoided. Since the time required for temperature adjustment in order to stabilize again the temperature of liquid agent before start of supplying the vapor of liquid agent also becomes unnecessary, the work efficiency is further enhanced. In the meanwhile, when the carrier gas is fed into the sealed container for supplying vapor, the local decrease in temperature because of local enhancement of evaporation of liquid agent will not occur. Thus, the surface temperature of liquid agent within the sealed container can be kept constant, and the stable flow rate of vapor can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid agent evaporator, comprising:
   a sealed container, having a generally flat upper internal surface and a vapor outlet, for accommodating a liquid agent;
   a carrier gas feed means for feeding a carrier gas into said sealed container; and
   a carrier gas blow means provided at said upper internal surface of said sealed container for blowing the carrier gas fed by said carrier gas feed means so that the blown carrier gas is directed to substantially the entirety of said upper internal surface.

2. A liquid agent evaporator, comprising:
   a sealed container, having a generally flat upper internal surface and a vapor outlet, for accommodating a liquid agent;
   a carrier gas feed means for feeding a carrier gas into said sealed container; and
   a carrier gas blow means provided at said upper internal surface of said sealed container for blowing the carrier gas fed by said carrier gas feed means so that the blown carrier gas comes in contact with substantially the entirety of said upper internal surface; wherein
   said carrier gas blow means includes a radially-blow means provided approximately in the center of said upper internal surface of said sealed container for blowing the carrier gas radially and with an initial velocity directed to at least to said upper internal surface side.

3. The liquid agent evaporator according to claim 2, wherein
   said radially-blow means includes an annular projection provided projecting downward in approximately the center of said upper internal surface of said sealed container, a lower end surface of said annular projection being formed such that a distance between the lower end surface of said annular projection and said upper internal surface becomes greater in said center part than at the periphery,
   said carrier gas feed means includes a gas feed tube which has an outer diameter smaller than an inner diameter of said annular projection, is provided penetrating the upper part of said sealed container and protruding through the center of said annular projection past the lower end surface of said annular projection, and has a plurality of gas flow holes provided around the lower part of the gas feed tube,
   said radially-blow means further includes a disk which has a top face in a shape corresponding to the lower end surface of said annular projection, and provided at the lower end of said gas feed tube so that a predetermined distance is provided between said top face and the lower end surface of said annular projection, and
   a space is defined by an internal peripheral surface of said annular projection, said top face of said disk, and said upper internal surface of said sealed container, said gas feed tube being adapted to feed said carrier gas into said space.

4. The liquid agent evaporator according to claim 3, wherein
   said plurality of gas flow holes are provided in an angularly equidistant manner along the periphery of said gas feed tube at predetermined positions, said positions having a prescribed height from a connection point between said gas feed tube and said top face of said disk.

5. The liquid agent evaporator according to claim 2, wherein
   said readily-blow means includes an annular projection provided projecting downward in approximately the center of said upper internal surface of said sealed container, the lower end surface of said annular projection being formed such that a distance between said lower end surface of said annular projection and said upper internal surface is greater in said center part than at the periphery,
   said carrier gas feed means includes a gas feed tube provided penetrating the upper part of said sealed container,
   said radially-blow means further includes a lower member having a top face in a shape corresponding to said lower end surface of said annular projection, and formed protruding from the bottom face of said sealed container such that a predetermined distance is provided between said top face and said lower end surface of said annular projection, and
   a space is defined by an internal peripheral surface of said annular projection, said top face of said lower member, and said upper internal surface of said sealed container, said gas feed tube being adapted to feed said carrier gas into said space.

6. The liquid agent evaporator according to claim 2, wherein
   said sealed container has a circular internal cross section, and said upper internal face becomes lower at the outer periphery thereof,
   said radially-blow means includes an annular projection provided projecting downward in approximately the center of said upper internal surface of said sealed container and having a generally flat lower end surface,
   said carrier gas feed means includes a gas feed tube provided protruding through the upper part of said sealed container, said radially-blow means further includes a disk having a generally flat top face and provided at the lower end of said gas feed tube so that a predetermined distance is provided between said top face of said disk and the lower end surface of said annular projection, and a space is defined by an internal peripheral surface of said annular projection, said generally flat top face of said disk, and said upper internal surface of said sealed container, said gas feed tube reaching said space and having a plurality of gas flow holes provided around the lower part thereof for feeding said carrier gas into said space.

7. The liquid agent evaporator according to claim 6, wherein said plurality of gas flow holes are provided in an angularly equidistant manner along the periphery of said gas feed tube at predetermined locations, said positions having a prescribed height from a connection point between said gas feed tube and said top face of said disk.

8. The liquid agent evaporator according to claim 1, wherein said carrier gas feed means includes a gas feed tube for feeding the carrier gas into said sealed container, and wherein said carrier gas blow means includes a gas blow tube being communicated with said gas feed tube and having a plurality of gas outlets formed on the top face side of said gas blow tube, and means for movably supporting said gas feed tube so that the top face of said gas blow tube is in close proximity to said upper internal surface of said sealed container and that the carrier gas blown from said plurality of gas outlets is blown to substantially the entire region of said upper internal surface of said sealed container.

9. The liquid agent evaporator according to claim 8, wherein said sealed container is in a hollow cylindrical shape having a circular cross section, said gas blow tube has a length shorter than the inner diameter of said sealed container, and said supporting means includes a rotary supporting means, wherein said plurality of gas outlets face upward and the top face of said gas blow tube is in close proximity to said upper internal surface of said sealed container, said rotary supporting means being provided in the center of said upper internal surface of said sealed container and adapted to rotate said gas feed tube about said center in a horizontal plane.

10. The liquid agent evaporator according to claim 9, wherein said plurality of gas outlets are disposed asymmetrically relative to a portion supported by said rotary supporting means.

11. The liquid agent evaporator according to claim 10, wherein said plurality of gas outlets adjacent to each other are spaced apart such that intervals between said plurality of gas outlets generally become smaller as a distance from said portion supported by said rotary supporting means increases.

12. A liquid agent evaporator, comprising:

a sealed container, having a generally flat upper internal surface and a vapor outlet, for accommodating a liquid agent;

a carrier gas feed means for feeding a carrier gas into said sealed container; and a carrier gas blow means provided at said upper internal surface of said sealed container for blowing the carrier gas fed by said carrier gas feed means so that the blown carrier gas comes in contact with substantially the entirety of said upper internal surface; wherein said carrier gas feed means includes a gas feed tube for feeding the carrier gas into said sealed container, and wherein said carrier gas blow means includes a gas blow tube being communicated with said gas feed tube and having a plurality of gas outlets formed on the top face side of said gas blow tube, and means for movably supporting said gas feed tube so that the top face of said gas blow tube is in close proximity to said upper internal surface of said sealed container and that the carrier gas blown from said plurality of gas outlets is blown to substantially the entire region of said upper internal surface of said sealed container, and wherein said sealed container is in a hollow cylindrical shape having a circular cross section, said gas blow tube has a length shorter that the inner diameter of said sealed container, and said supporting means includes a rotary supporting means, wherein said plurality of gas outlets face upward and the top face of said gas blow tube is in close proximity to said upper internal surface of said sealed container, said rotary supporting means being provided in the center of said upper internal surface of said sealed container and adapted to rotate said gas feed tube about said center in a horizontal plane, and wherein said plurality of gas outlets adjacent to each other are spaced apart such that intervals between said plurality of gas outlets generally become smaller as a distance from said center increases.

* * * * *